Nov. 30, 1943.　　　K. W. COUSE　　　2,335,584
PORTABLE FOLDABLE MAST STRUCTURE
Filed Jan. 20, 1942　　16 Sheets-Sheet 2
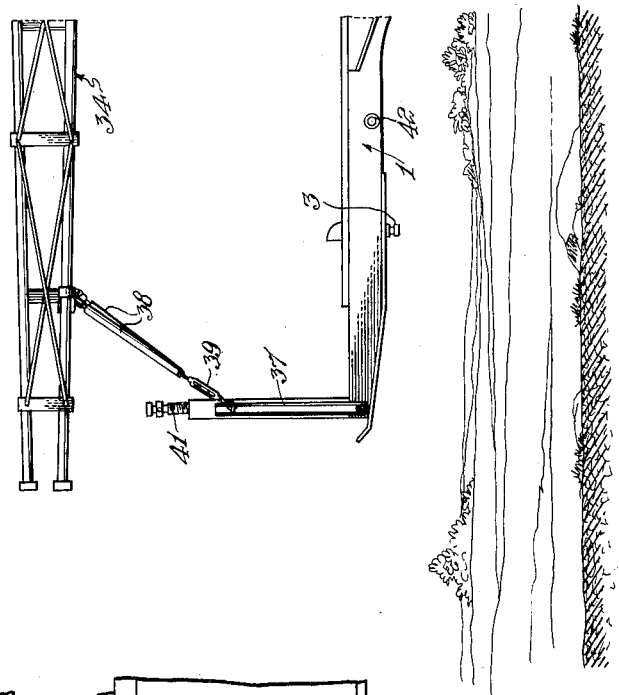
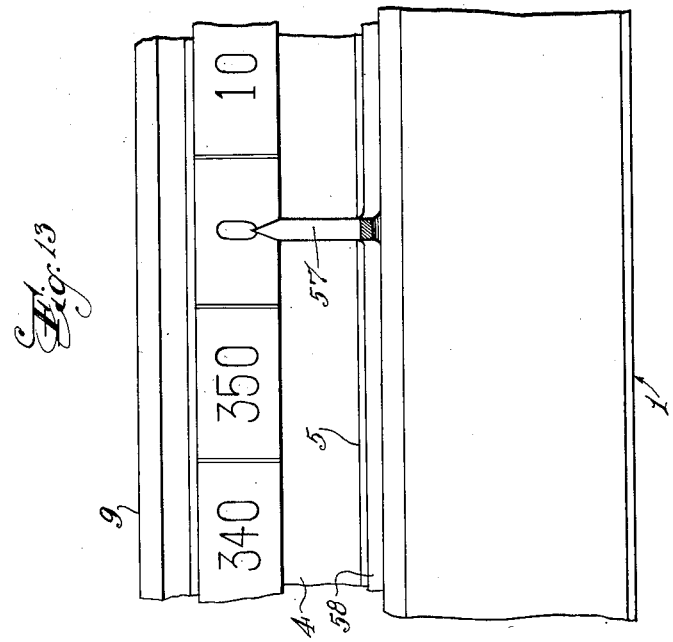
INVENTOR
Kibbey W. Couse
BY
A. D. T. Libby
ATTORNEY Nov. 30, 1943. K. W. COUSE 2,335,584
PORTABLE FOLDABLE MAST STRUCTURE
Filed Jan. 20, 1942 16 Sheets-Sheet 3
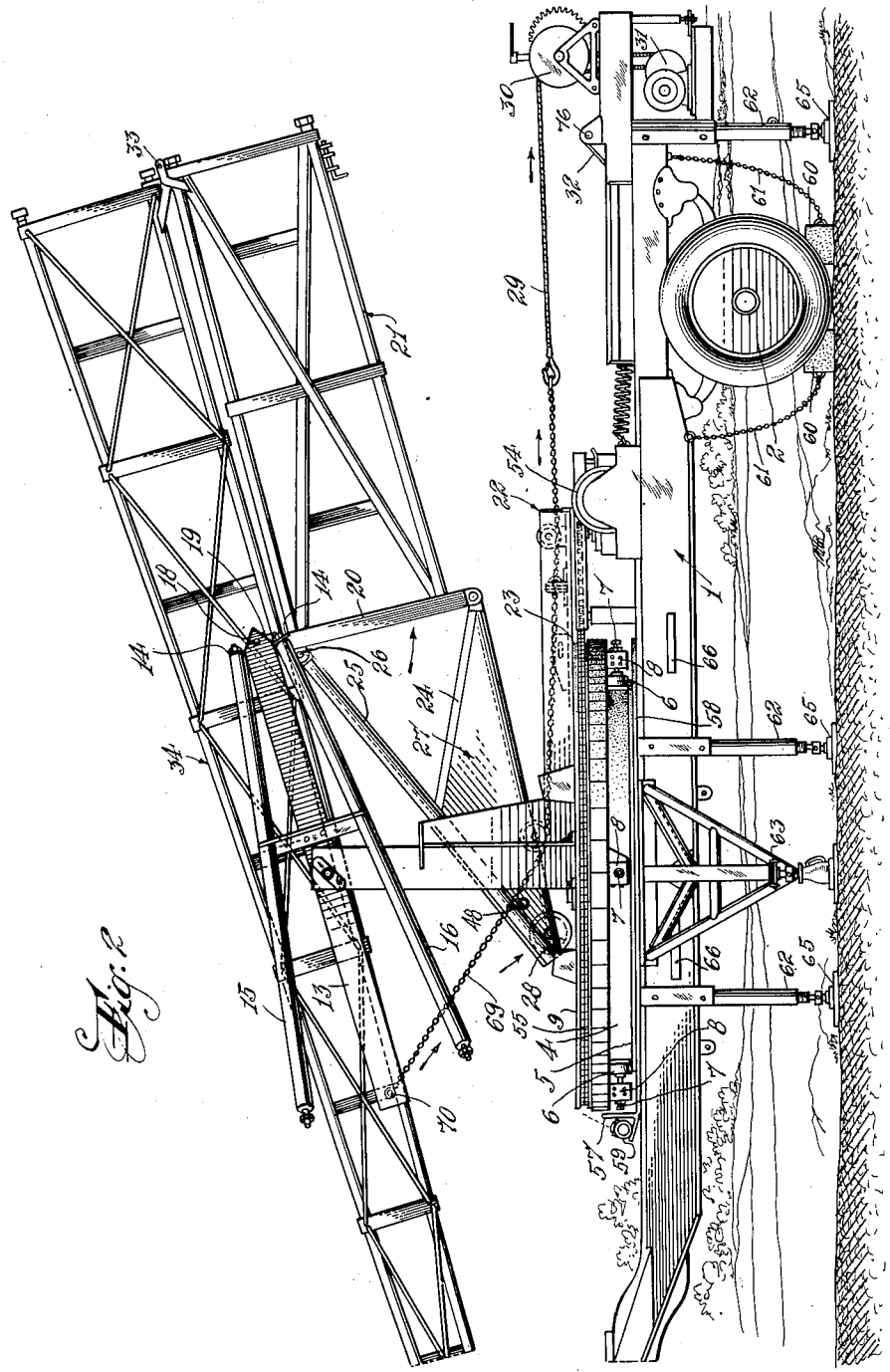
INVENTOR
Kibbey W. Couse
BY
A. D. T. Libby
ATTORNEY Nov. 30, 1943.  K. W. COUSE  2,335,584
PORTABLE FOLDABLE MAST STRUCTURE
Filed Jan. 20, 1942  16 Sheets-Sheet 4
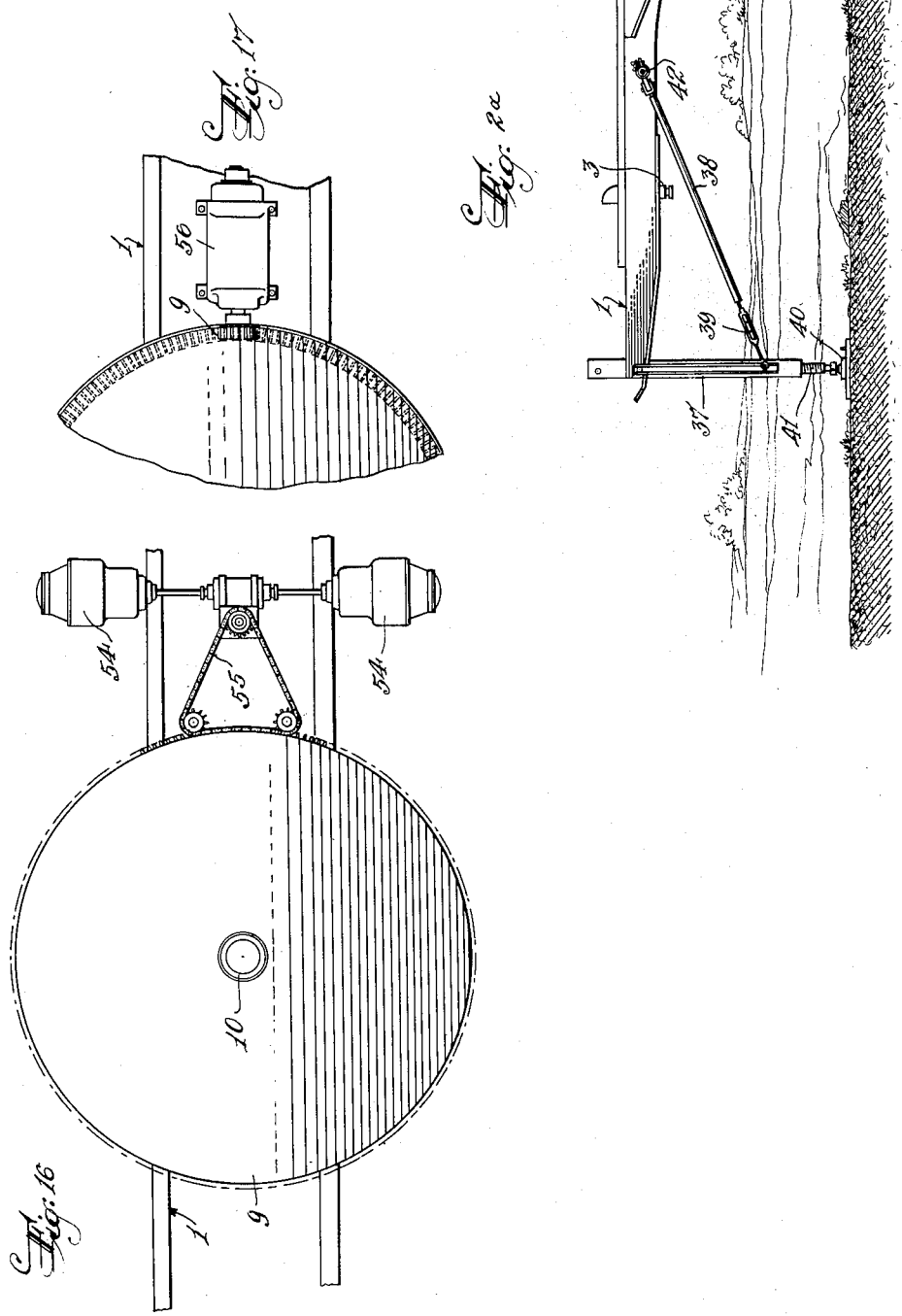
INVENTOR
Kibbey W. Couse
BY A. D. T. Libby
ATTORNEY Nov. 30, 1943.   K. W. COUSE   2,335,584
PORTABLE FOLDABLE MAST STRUCTURE
Filed Jan. 20, 1942   16 Sheets-Sheet 5
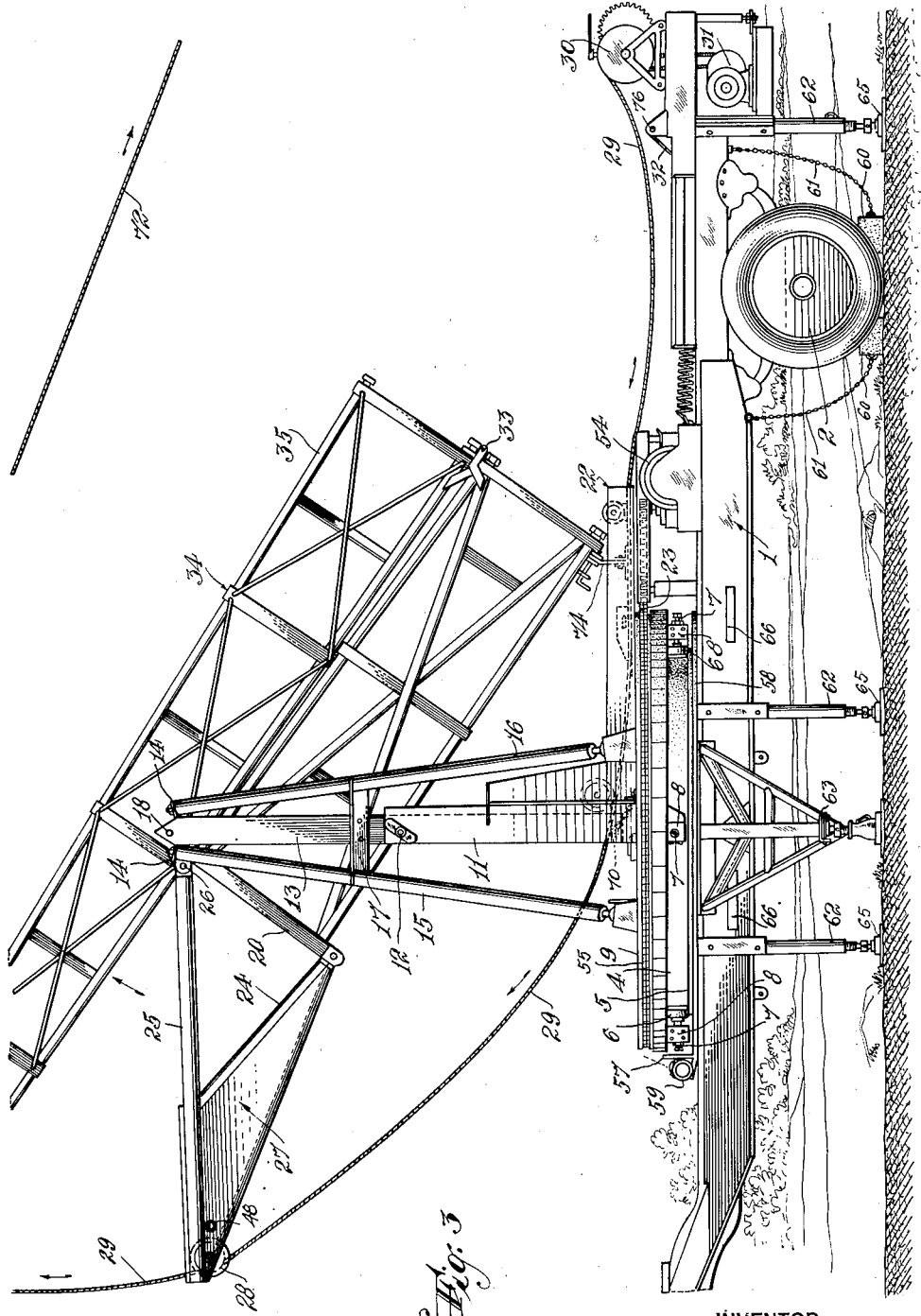
INVENTOR
Kibbey W. Couse
BY
A. D. T. Libby
ATTORNEY

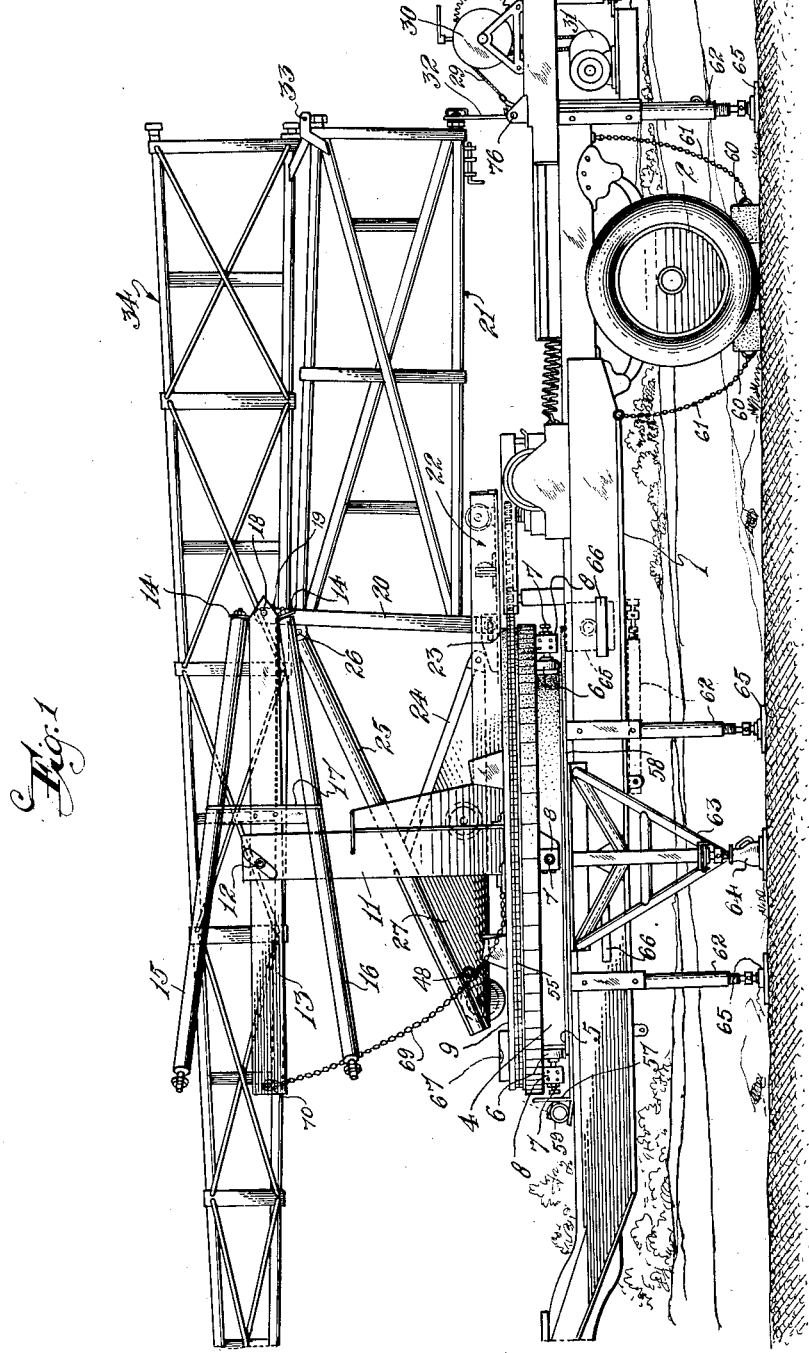

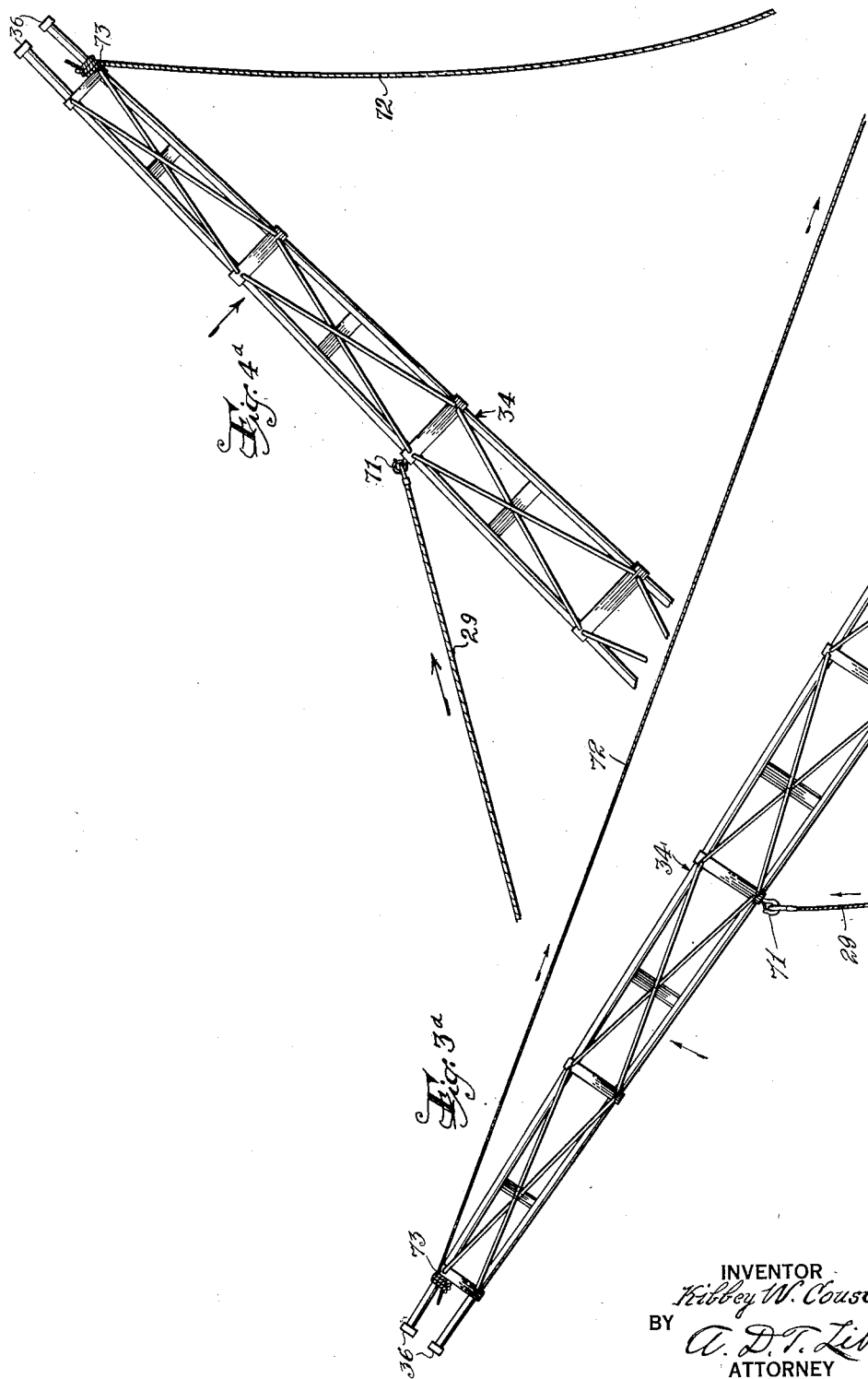

Nov. 30, 1943.　　　K. W. COUSE　　　2,335,584
PORTABLE FOLDABLE MAST STRUCTURE
Filed Jan. 20, 1942　　　16 Sheets-Sheet 7

INVENTOR
Kibbey W. Couse
BY
ATTORNEY

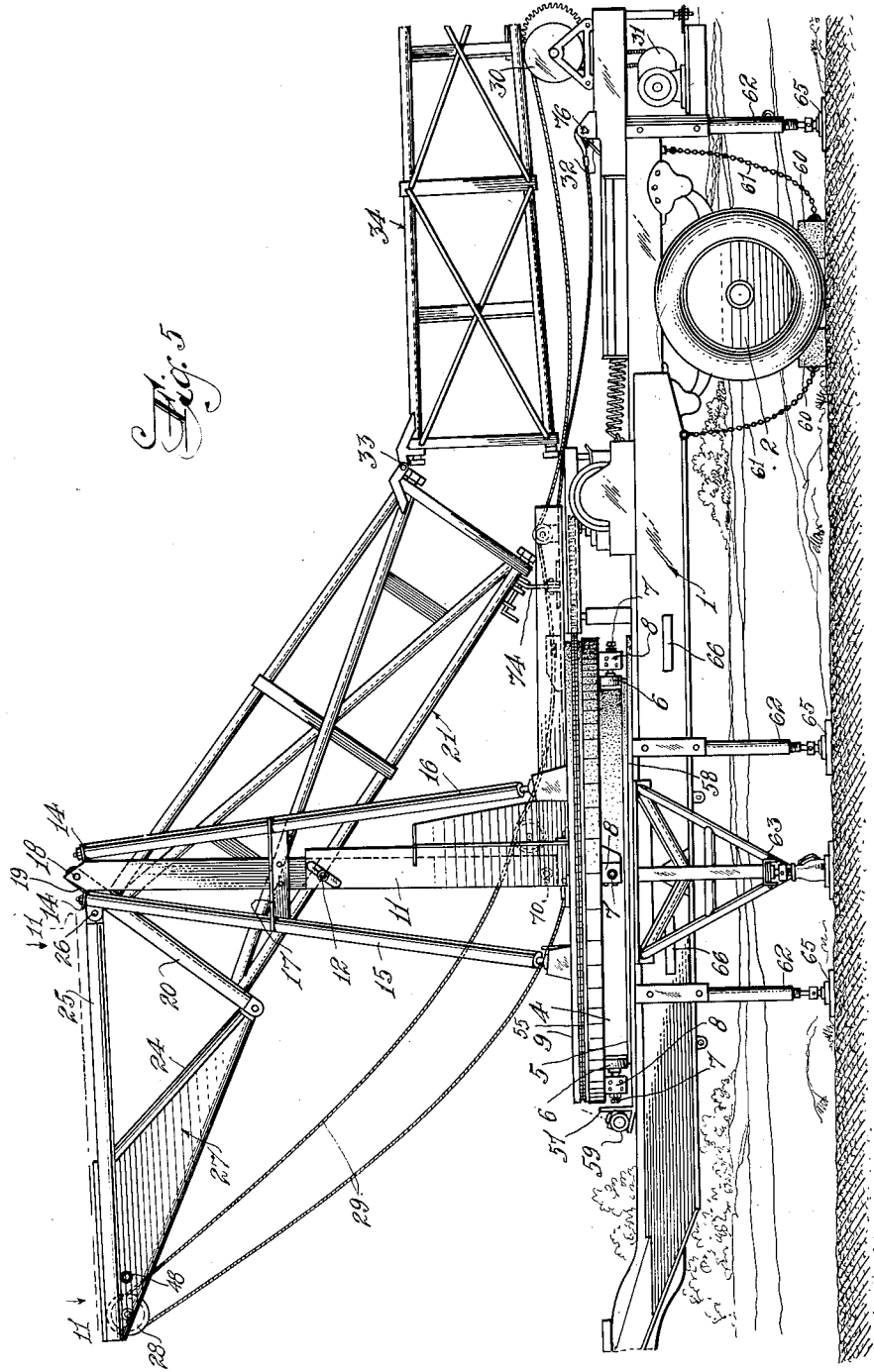

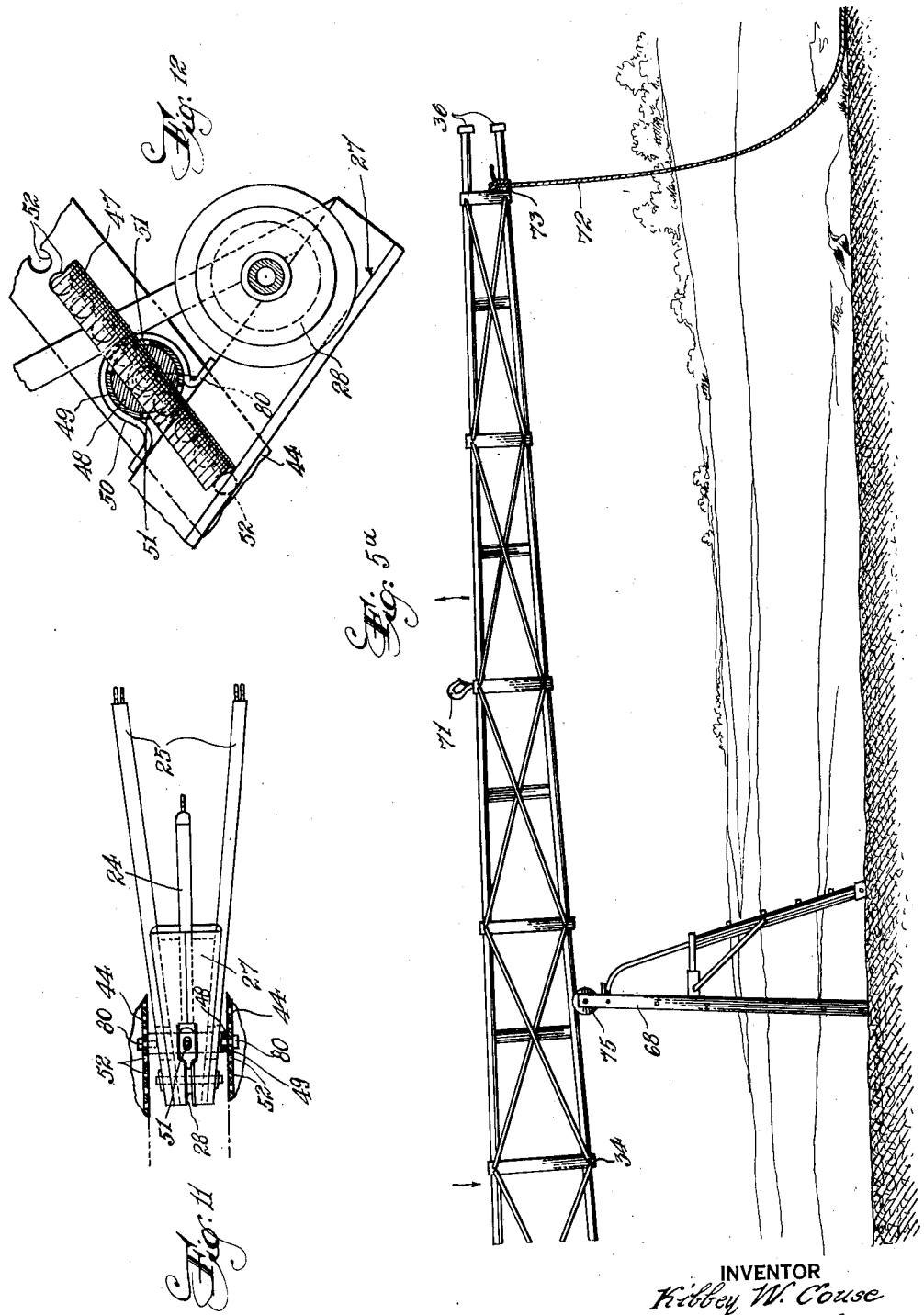

Nov. 30, 1943.  K. W. COUSE  2,335,584
PORTABLE FOLDABLE MAST STRUCTURE
Filed Jan. 20, 1942  16 Sheets-Sheet 10
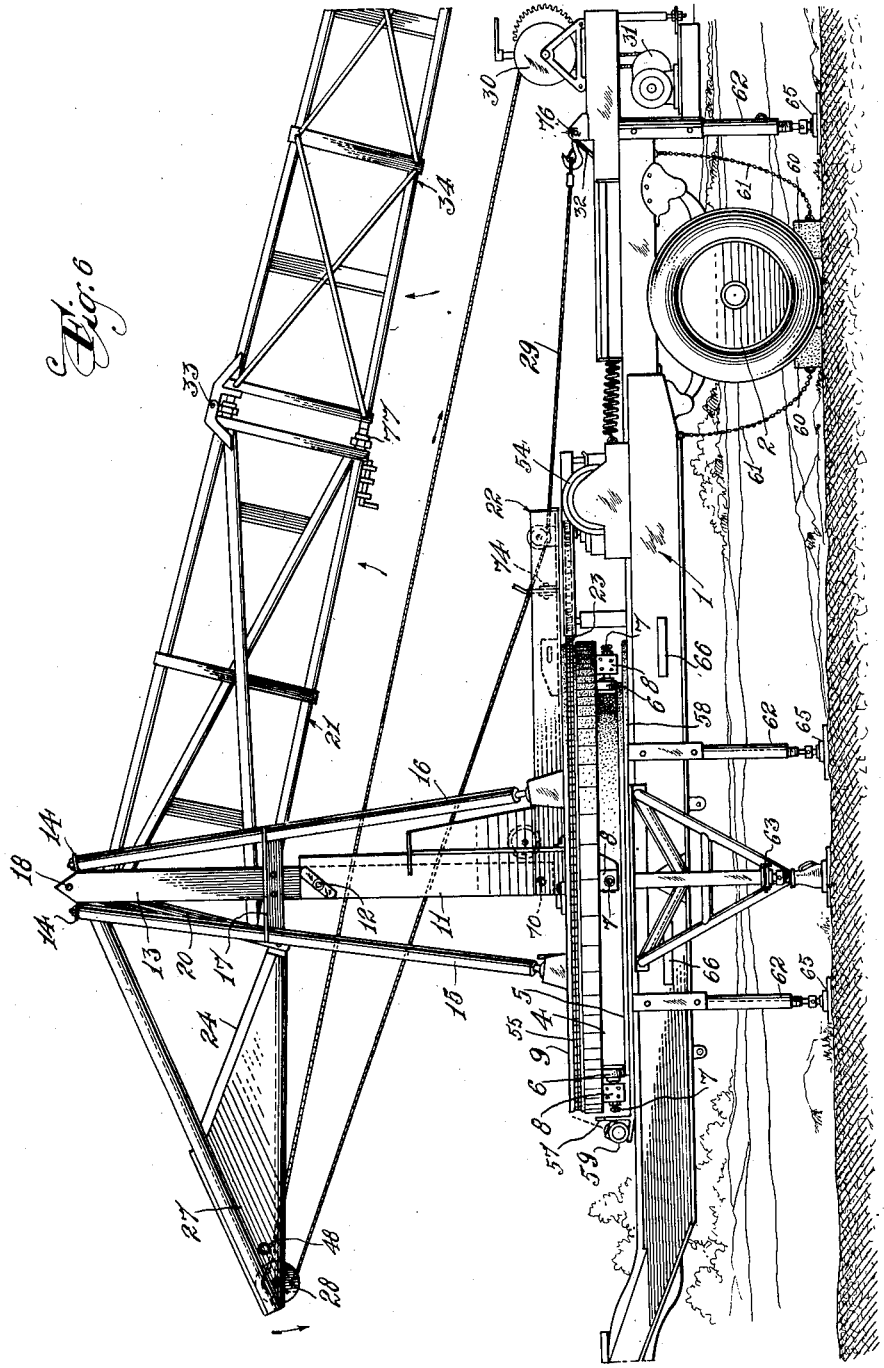
INVENTOR
Kibbey W. Couse
BY
A. D. T. Libby
ATTORNEY Nov. 30, 1943.   K. W. COUSE   2,335,584
PORTABLE FOLDABLE MAST STRUCTURE
Filed Jan. 20, 1942   16 Sheets-Sheet 11
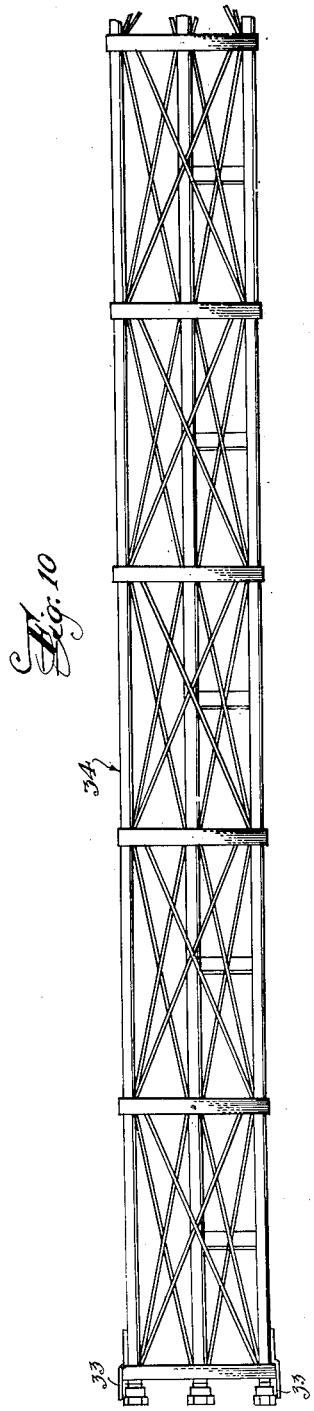
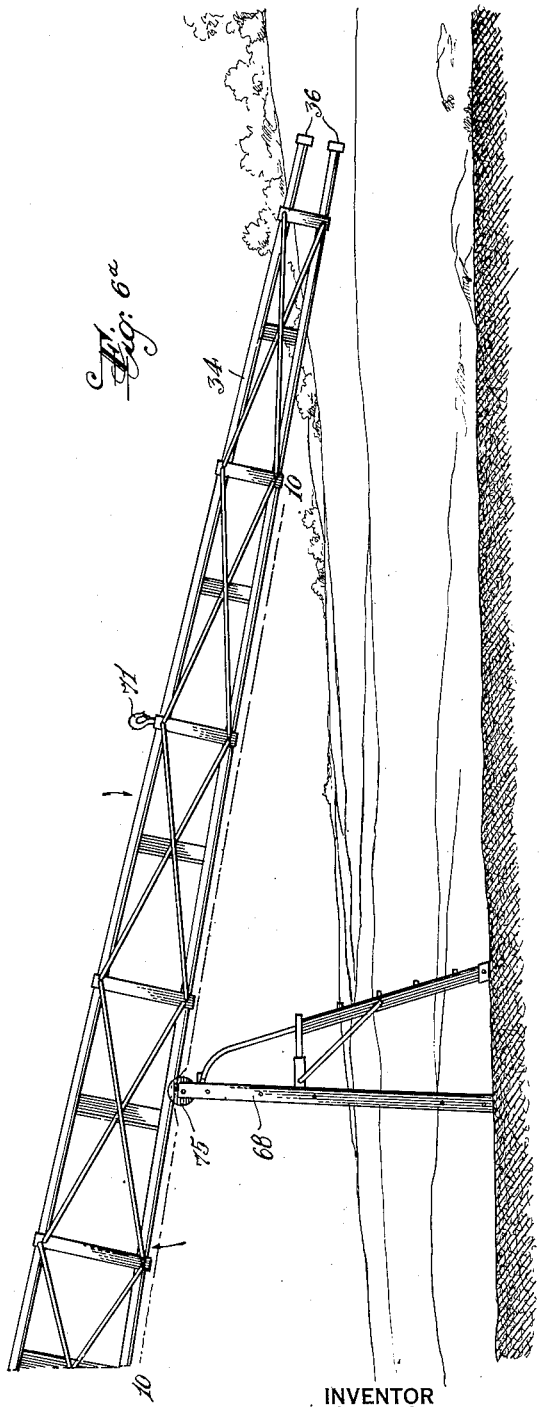
INVENTOR
*Kibbey W. Couse*
BY
*A. D. T. Libby*
ATTORNEY

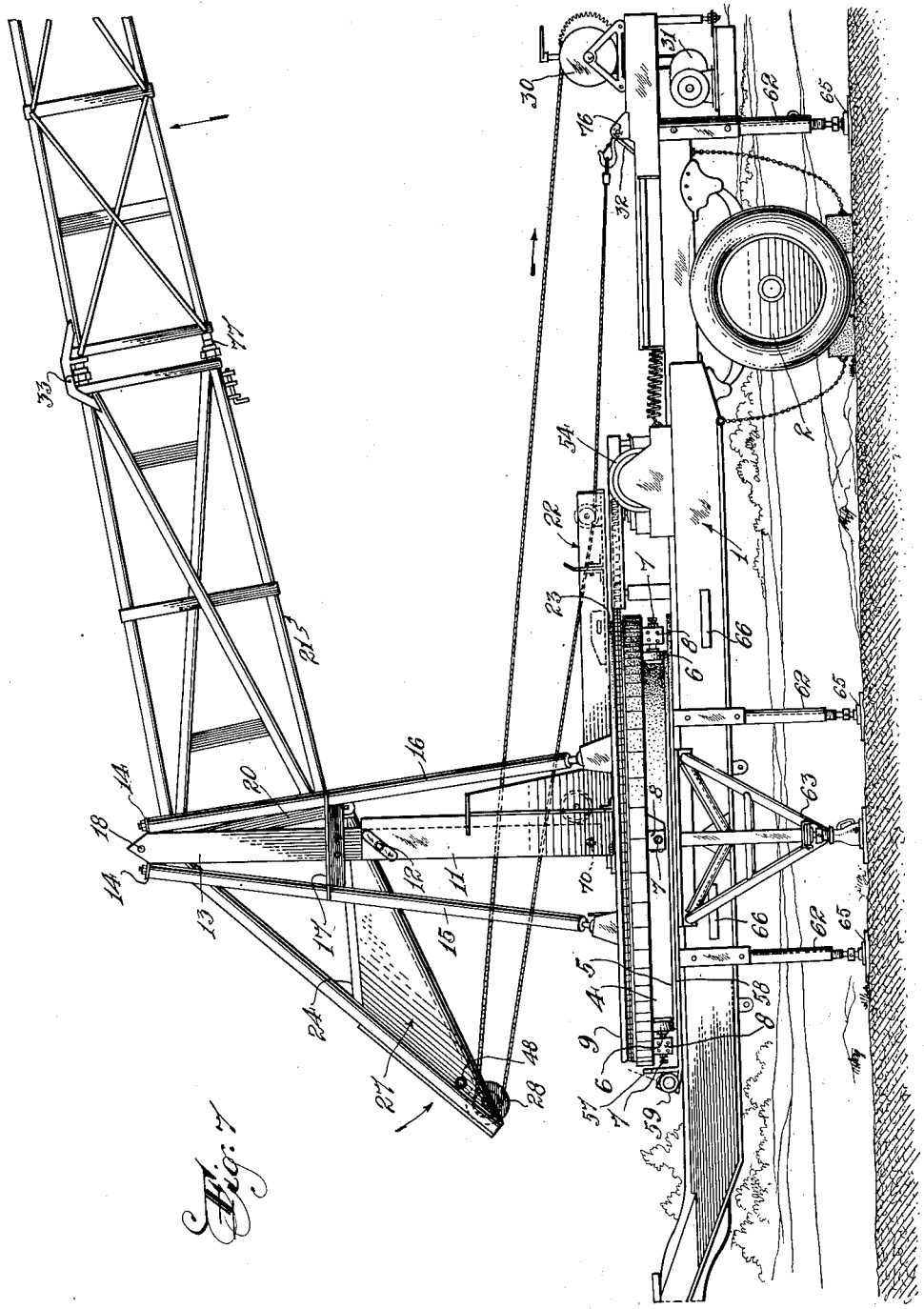

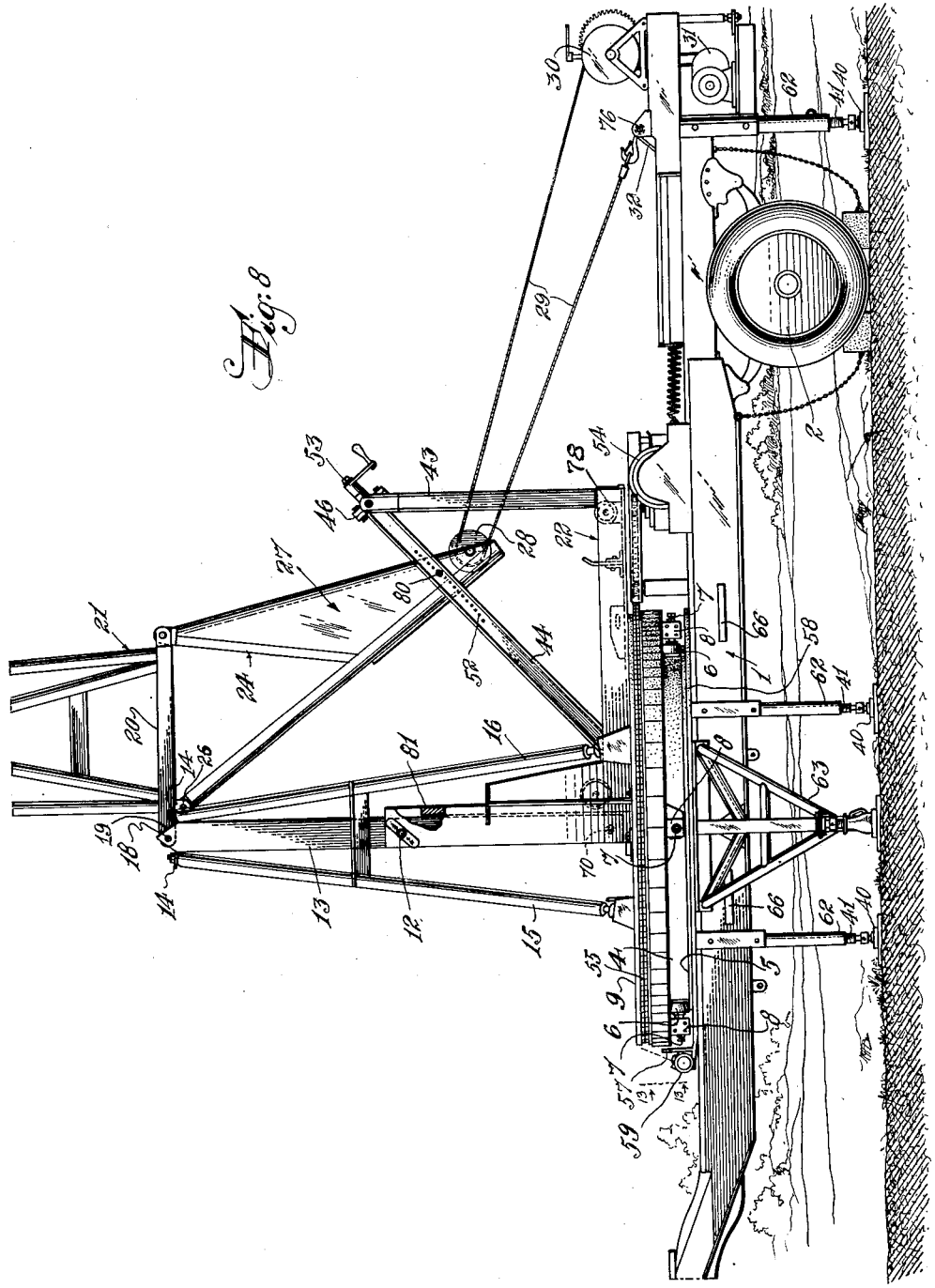

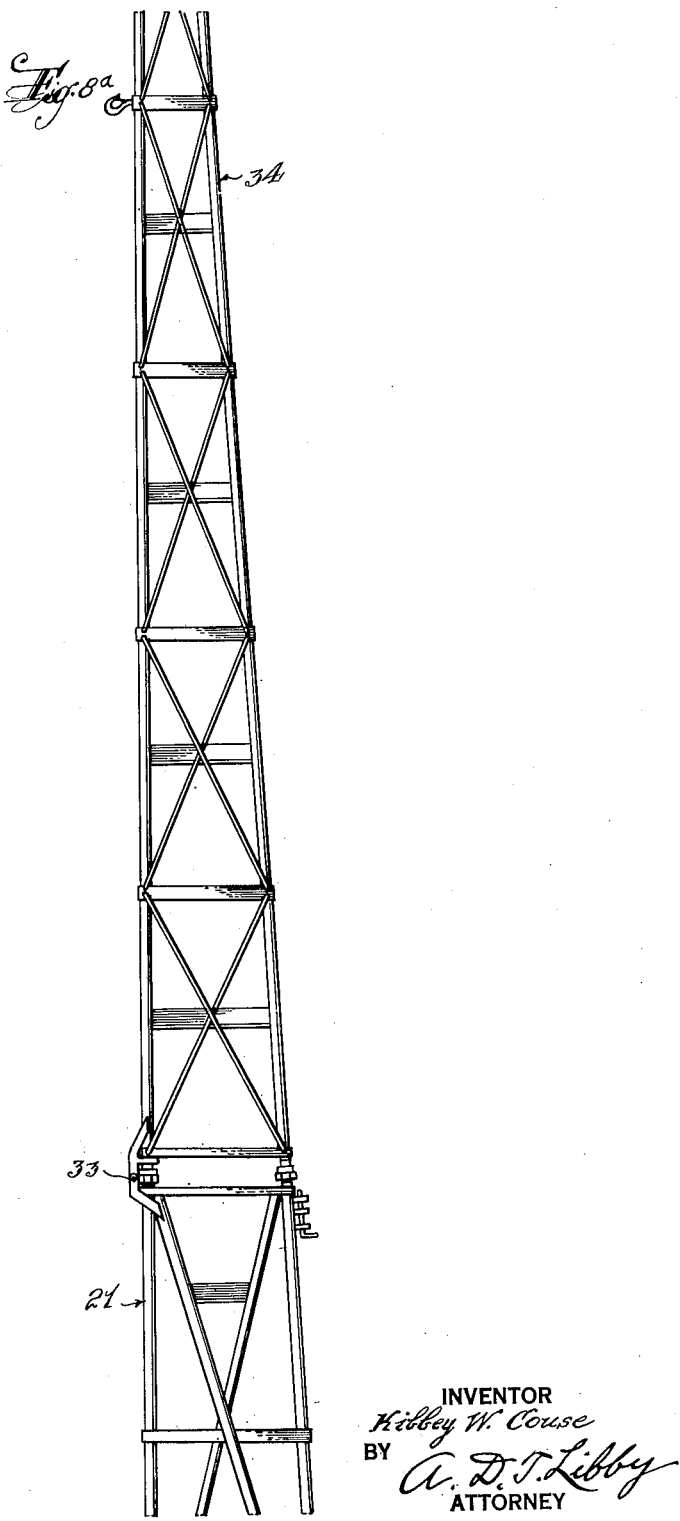

Nov. 30, 1943.   K. W. COUSE   2,335,584
PORTABLE FOLDABLE MAST STRUCTURE
Filed Jan. 20, 1942   16 Sheets-Sheet 15
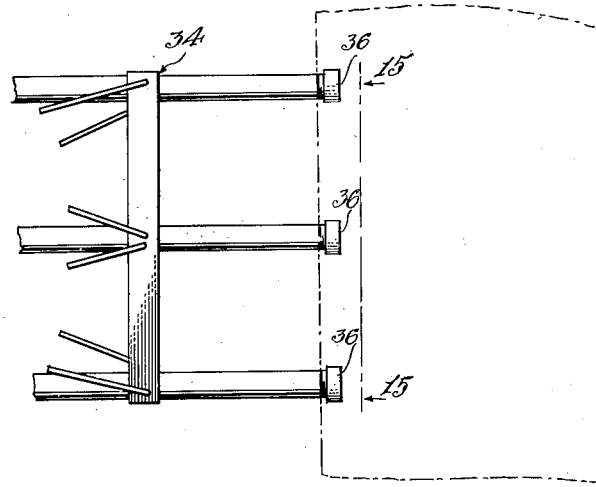
Fig. 14
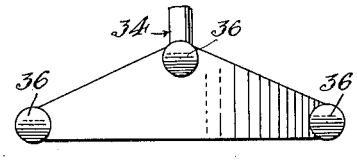
Fig. 15
Fig. 8b
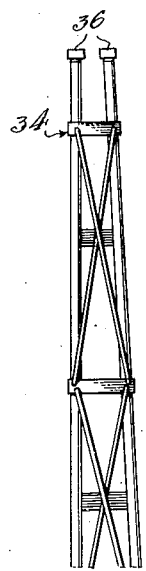
INVENTOR
Kibbey W. Couse
BY
A. D. T. Libby
ATTORNEY Nov. 30, 1943.    K. W. COUSE    2,335,584
PORTABLE FOLDABLE MAST STRUCTURE
Filed Jan. 20, 1942    16 Sheets-Sheet 16
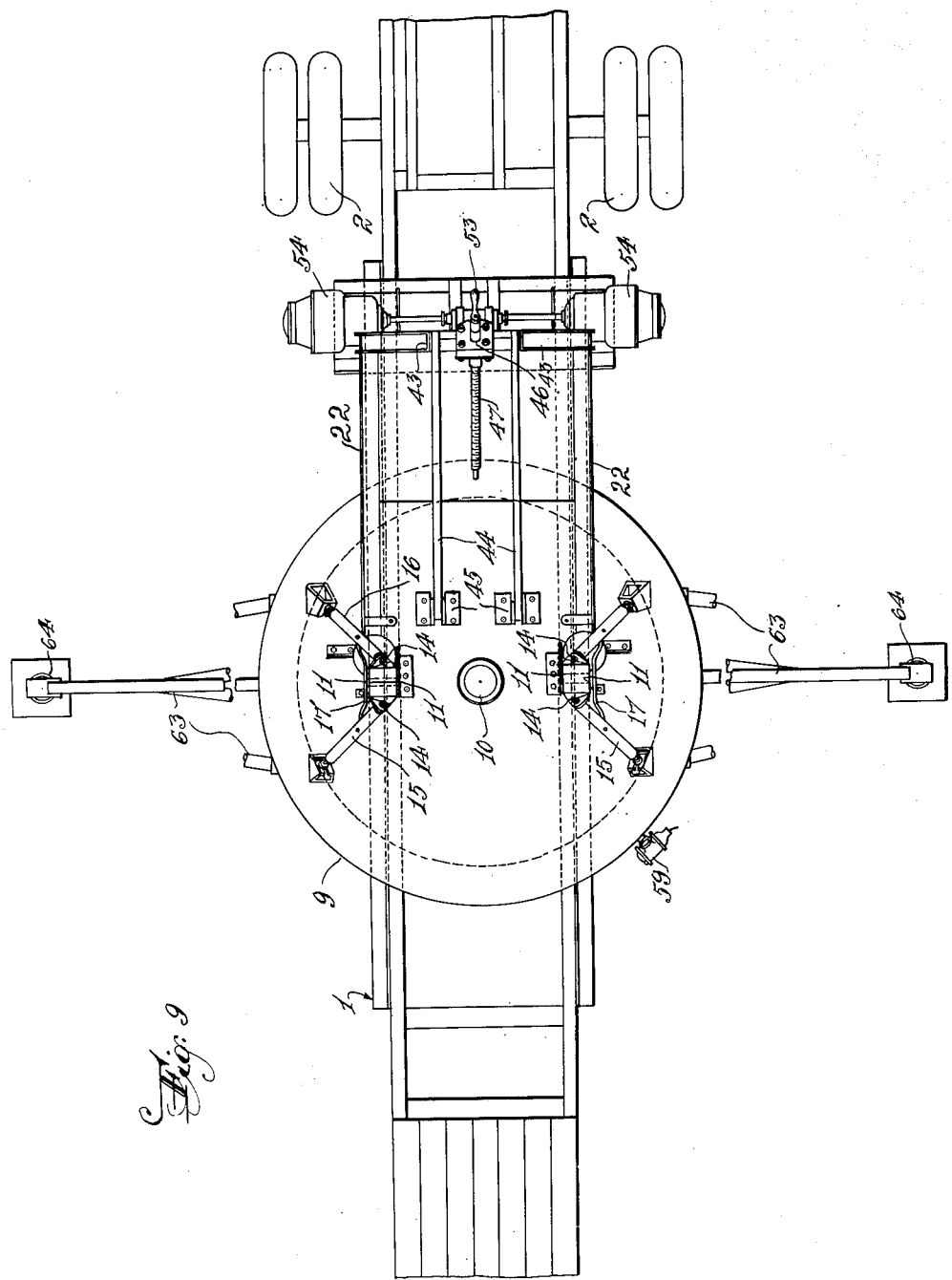
INVENTOR
Kibbey W. Couse
BY
A. D. T. Libby
ATTORNEY Patented Nov. 30, 1943

2,335,584

UNITED STATES PATENT OFFICE 2,335,584

PORTABLE FOLDABLE MAST STRUCTURE

Kibbey Whitman Couse, Newark, N. J.

Application January 20, 1942, Serial No. 427,518

16 Claims. (Cl. 189—11)

This invention relates to a portable mast structure especially adapted for use as a support for a radio antenna and which comprises a transportable chassis on which the mast is carried. The mast is of such a construction that it may be folded up on the chassis during the transportation period and then elevated to the use position; that is to say, to a substantially vertical position where the antenna—if the structure is used for that purpose—is carried on the top of the mast in a position to receive or transmit aerial messages.

As a general proposition, the higher the antenna can be raised above the ground, the better it will perform its functions; yet the longer or higher the mast carrying the antenna, the greater the problem of raising and lowering it and transporting it from one place to another.

It is therefore the general object of my invention to provide a transportable mast structure which, when used for radio purposes, will project an antenna a substantial distance into the air when in elevated position, yet one that can be folded up without any great amount of trouble onto the chassis carrying it, for transportation purposes, it being kept in mind that where the entire structure is transported over various sections of the country, highway bridges are encountered, and the height of the entire structure, when in folded or transportable position, must be kept within bounds; i. e., so as to pass under present-day overhead bridges. In order to illustrate my invention, I have chosen to show it as applied to a radio antenna mast.

Another object of my invention is to provide a portable antenna mast structure in which the mast and antenna may be rotatably movable on the chassis through a full circle.

A further object of my invention is to provide means for tilting the mast and the antenna a certain amount after it has been raised to its elevated position.

A still further object of my invention is to provide means for leveling up the antenna support on the chassis so that the mast can be placed in a true perpendicular position.

Numerous other objects will be apparent on a reading of the attached specification taken in connection with the annexed drawings, wherein:

Figure 1 is a side or elevational view of the greater portion of the apparatus with the antenna mast in folded position, as it is during transportation, but the chassis is shown in a position ready to raise the antenna mast.

Figure 1a is a view of the left-hand end of Figure 1 which could not be applied to the sheet showing Figure 1, and shows an outboard support from the end of the chassis to the extremity of the upper section of the mast.

Figure 2 is a view of the structure of Figure 1 shown in substantially the first step of the raising of the antenna mast.

Figure 2a is a view of the left-hand end of the chassis shown in Figure 2 but with the outboard bearings for the end of the antenna mast moved into a position to act as an outboard support for the end of the chassis.

Figure 3 is a view similar to Figure 1 but showing a further step in the process of raising the mast.

Figure 3a is the upper end of the upper section of the mast which fits onto Figure 3.

Figure 4a is a view similar to Figure 3a but showing the continuation of the upper section of the mast in the position of Figure 4.

Figure 5 is a view similar to Figure 1, but showing a still further step in the erection of the machine.

Figure 5a shows an extension of the upper section of the mast in the position of Figure 5. This view also shows a rest for this upper section of the mast at this stage of the erection proceedings.

Figure 6 is a view similar to Figure 1 but showing a further step in the erection of the mast.

Figure 6a is a view of the upper section of the mast, similar to Figure 5a, but in the position of Figure 6.

Figure 7 is a view similar to Figure 1 but showing a further step in the erection of the mast.

Figure 8 is a view similar to Figure 1, but with the antenna mast raised to its final vertical or perpendicular position and with a modified form of certain support members.

Figure 8a is a continuation of the antenna mast as shown in Figure 8.

Figure 8b is the upper end of the antenna section shown in Figure 8a.

Figure 9 is a plan view of Figure 8 with the tower and some of the other details omitted.

Figure 10 is a view of Figure 6 substantially on the line 10—10 of Figure 6a.

Figure 11 is a view in the direction of the line 11—11 of Figure 5, showing the triangular base portion of the antenna mast.

Figure 12 is a part-sectional and elevational view taken at the junction of the antenna adjusting screw and the lower portion of the antenna as shown in Figure 8.

Figure 13 is a fragmentary view of a section of the turntable looking in the direction of the arrows 13—13 of Figure 8.

Figure 14 is a view of the extreme upper end of the antenna mast.

Figure 15 is a view on the line 15—15 of Figure 14.

Figure 16 shows a modified form of means for operating the turntable carrying the mast.

Figure 17 is a fragmentary view showing a still further modified means of moving the turntable.

Figure 4:
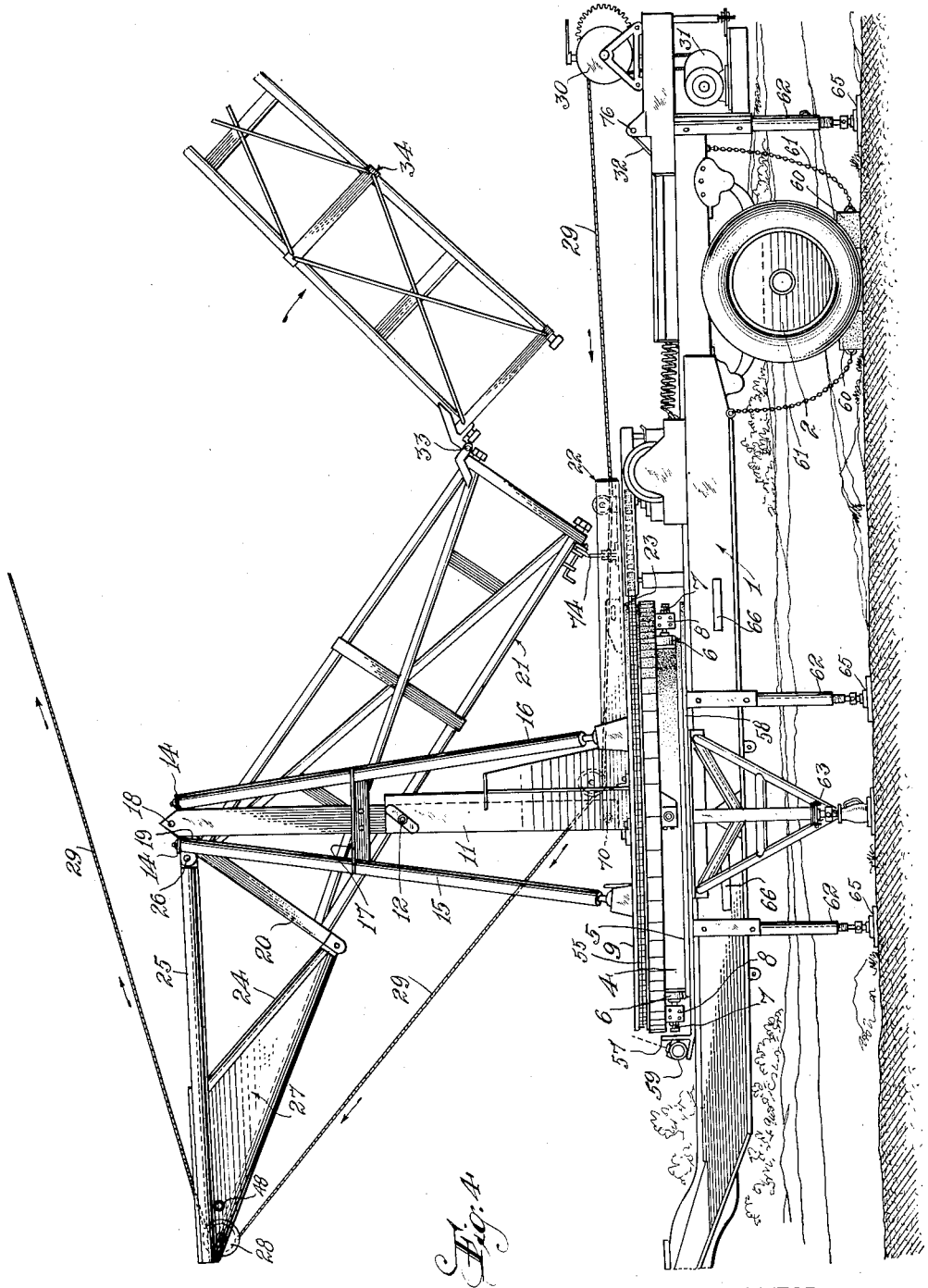
Figure 4 is a view similar to Figure 1 but showing a still further step in the erection of the antenna mast.

Referring to the various views wherein like numbers refer to corresponding parts, 1 represents, generally, the frame of a chassis which may be in the form of a trailer or truck. As shown in the various figures, a set of wheels 2 is located at one end of the chassis. The opposite end of the chassis 1 has attachment means 3 for fastening a truck thereto. These would not be required if another pair of wheels were used at this end of the chassis.

Carried on the chassis 1, is a support plate 4 having an annular raceway, the bottom flange 5 of which is shown for receiving rollers 6 carried on the ends of an adjustable stud 7 which in turn is supported in a boss or lug 8 extending downwardly from the bottom of the turntable 9. The support plate 4 has a central stud 10, referring to Figure 9, for positioning the turntable 9 thereon.

Fastened on a diameter of the turntable are two pairs of vertically extending supports 11, each pair being in spaced relation as shown in Figure 9. These members 11 are preferably welded to the turntable 9.

Pivoted to each pair of the members 11 and therebetween on the pivot pin 12, is an arm 13. At one end of each of the arms 13 is a pair of lugs 14 and to these lugs are rigidly fastened support legs 15 and 16 which are alike. A cross-brace 17 is securely anchored as by welding to the legs 15 and 16 as well as to the arm 13, it being understood that there is a set of these legs and arm in cooperation with each pair of supports 11 as shown in Figure 9. Instead of two separate members 11, I may use a pair of heavy channel irons, see Figure 8, having a portion of the web 81 removed adjacent the pivot pin 12 to allow the member 13 to swing into horizontal position as shown in Figure 1, and the end of this cut-off portion will then act as a stop and support for the member 13.

The arms 13 are pivoted at 18 to lugs 19 on ends of spaced members 20 which forms a part of the section 21 of the mast. When the antenna is in collapsed position for transportation, the members 20 are fastened to members 22 carried by the turntable at the points 23, but in one of the early steps of assembly as illustrated in Figure 2, each pivot bolt 23, as shown in Figure 1, is removed and a member 24 is connected to the pivot bolt 23. As shown in Figure 1, the member 24 is disconnected in the position shown therein. However, it is rigidly fastened to the member 25 which is bolted at 26 to the mast section 21.

Between the members 24 and 25 there is securely anchored, as by welding, a strengthening structure 27 made up of plates, bolts, etc. At the outer extremity of the triangularly shaped structure just described, and which comprises the real base portion for the mast, is positioned a guide wheel 28 on which operates a cable 29 which is connected to a winch 30 adapted to be operated by any satisfactory means such as an electric motor 31 which may be operated from any available means such as a battery that may be carried by the outfit.

In the transportation position, the antenna section 21 is fastened by any satisfactory means such as straps 32 to the chassis 1. Also, this same end of the section 21 is pivotally attached at 33 to the section 34 which, as shown in the drawings, is the upper section of the antenna mast. No detail description of the antenna sections 21 and 34 is necessary as they are clearly shown in the drawings and the details may be varied over a wide range, but as indicated, the antenna is made of steel in such a way as to stand enormous strains. The three main frame members 35 are of seamless tubing and may be filled with oil to prevent rusting on the interior portions of the tubes, all ends of which are securely sealed. The upper ends of the section 34 are preferably provided with removable caps 36 which can be removed for putting in the oil or for making attachment for some sort of an antenna structure per se, or for a seat.

While the antenna is in collapsed position as shown in Figures 1 and 1a, the top section 34 is supported to one end of the trailer or truck by a pair of support members 37 on each side of the chassis and connected to the mast section 34 by rods 38 which cross each other diagonally and are connected to their respective members 37, each with its own turnbuckle 39. When the antenna is in raised position, the members 37 are thrown downwardly and act as jack supports in connection with a support plate 40, screws 41 acting as jack-screws, and the rods 38 are fastened to the chassis at 42, all as indicated in Figure 2a.

After the antenna mast has been moved to its exact vertical position as shown in Figures 8, 8a and 8b, a pair of members 43 having inturned ends are erected as shown in Figure 8, and a pair of braces 44, which are preferably pivotally mounted by mountings 45 to the turntable, are raised to the position shown in Figure 8 and are fastened to a bearing 46 which is carried on the members 43 in such a manner as to have a slight oscillatory motion for a purpose which will be directly pointed out.

An elongated screw 47 is supported by the bearing structure 46 and this screw passes through a threaded member 48 carried by a sleeve 49 which in turn is supported by a pair of oppositely positioned collar supports 50 which are rigidly fastened, as by welding, to the end of the sub-base 27. The sleeve 49 is also fastened to the collars 50 as by welding and is provided with a pair of oppositely disposed elongated slot openings 51 to allow the adjusting screw 47 freedom of movement as the sub-base 27 and the mast are accurately moved by means of the screw 47, which merely turns in the bushing.

The members 44 are provided with holes 52 which are arcuately positioned about the pivotal point 18 and are adapted to receive screw studs 80 which are adapted to enter the threaded ends of the member 48 and thereby lock the sub-base 27 to the brace members 44.

From the above it will be readily understood that when the mast is required to be tilted, the screw studs 80 are removed and then, by turning the screw 47 by the handle 53, the mast may be tilted a few degrees to permit correction due to effects of air layers on the radio beams. Then the screw studs 80 are put into the holes 52 in the new position of the machine.

By reference to the various figures; for example, Figure 8, it will be seen that the turntable 9 may be connected by an endless chain to two motors 54 as shown in Figure 9—one for turning the turntable in one direction and the other for turning it in the opposite direction; or a single reversible motor may be used. Furthermore, this particular construction may be varled as shown in Figure 16 by a short contact chain 55; or the construction of Figure 17 may be used whereby a reversible motor 56 is used and connected by suitable gearing directly to the turntable 9. While I prefer to use motors for operating the turntable, it may be operated by hand where no other power is available.

By reference to Figure 13 it will be seen that the periphery of the turntable is marked off into degrees so that the operator will know how many degrees the turntable has been moved. Furthermore, an indicator 57 is used and carried on a movable ring 58 so that the indicator may be set to zero at any position of the turntable when the apparatus is put into operation. Preferably, a light 59 (see Figure 8) is used to illuminate the scale at the point where the indicator 57 is set.

After the entire structure has been conveyed to the place where it will be used, the chassis 1 is leveled up in the following manner: The wheels 2 are trigged by the blocks 60 which are carried by means of the chain 61 to the chassis end by a plurality of jacks 62 and outriggers 63 which carry on their extremities a pair of jacks 64. Each of the jacks 62 has support plates 65 adapted to be placed on the ground so as to be engaged by the jacks 62. The support plates 65 are normally carried in pockets 66 on the various parts of the chassis where they will be quickly available for use in lining up the chassis as shown in Figure 1. The jacks 62 are normally carried as shown by the dotted position from which they can be quickly dropped down into position. By reason of these jacks and outriggers, the chassis can be quickly lined up so that the turntable will be level as indicated by the level 67 on the turntable, and held by these parts in a rigid manner so that there will be substantially no movement of the chassis during the raising and lowering of the antenna mast.

As shown in Figure 6a, a reinforced ladder 68 is used during the raising and lowering operations of the mast. The manner in which it is used will be further described in connection with the various steps of procedure of raising and lowering the mast which may now be briefly described.

After the chassis has been fixed and adjusted into position as already described, the mast is freed at its ends by removing the strap 32, the rods 38 and support members 37 which are moved from the position in Figure 1a to the position of Figure 2a. The cable 29 on the winch 30 is connected by another cable or chain 69 at 70 to the free end of the member 13. Then on applying power to the winch 30 as by the motor 31, the brace structures on opposite sides of the mast sections are moved from the position of Figure 1 to the position of Figure 3 where the arm 13 and the legs 15 and 16 of each brace structure are fastened to the turntable in the manner heretofore described.

During this transition proceeding of the brace structures, the antenna sections are tilted somewhat as shown in Figure 2, as it will be seen that the pivotal point 18 must be raised above the turntable in order to allow the arm 13 and the legs 15 and 16 to come into position. Incidentally, it may be mentioned that the tilting of the mast sections shown in Figure 2 may be enhanced by bearing down on the outer or top end of the antenna structure.

When the arm 13 of the brace structure has reached the position shown in Figure 3, the cable 29 is disconnected therefrom and the arm fastened to the turntable along with the legs 15 and 16, and the cable 29 or an extension thereof such as 69, is passed over the roller-pulley 28 of the sub-base structure 27 and attached to a hook or fastener 71 on the upper section 34 of the mast. Also, a cable or rope 72 is attached at 73 to the upper end of the section 34.

The winch is then operated to allow the mast sections to be moved from a position somewhat similar to that shown in Figure 2 to the position shown in Figure 3, when the end of the lower mast section is fastened at 74 to fastening means on the chassis. Power (usually man power) is then applied to the rope 72 and the top section 34 of the antenna is caused to move about the hinge 33, and after the vertical point is passed, no more pull on the cable 72 is necessary, but the winch 30 is operated in a manner to allow the top antenna section 34 to move to the position shown in Figures 5 and 5a, wherein the section 34 engages a rest 68 which may be in the form of a suitable type of step-ladder having a roller 75 at the top for receiving the section. In this position the cable 72 may now be disconnected from the mast. Likewise, the cable 29 is passed over the roller pulley 28 in reverse direction and fastened at 76 to the chassis at a point near the winch 30, and the section 21 is disconnected from the fastener 74 (see Figure 5), and the winch operated in a manner to move the sections from the position shown in Figure 5 to that shown in Figure 6, bringing the sections 34 and 21 together where they are fastened by suitable fastening means 77.

The winch 30 is now operated in a manner so as to raise the mast to a vertical position, one intermediate step being shown in Figure 7. When the mast reaches the vertical or receptive position as shown in Figures 8, 8a and 8b, a pair of oppositely disposed, preferably channel-shaped members 43, which may be removably connected at 78 to extension members 22 carried by the turntable 9, are moved into vertical position and connected with the brace members 44 which are fastened at 45 to the turntable 9 as heretofore described.

The mast structures which I have built, and one of which is herein shown and described, have, when folded, an over-all height from the ground of approximately ten feet, while in elevated position the top of the mast is approximately sixty-five feet above the ground. The mast is especially adapted for use in connection with radio antennae, but may also be used for other purposes such as an observation tower as it is very easy for a person to climb the lattice structure of the mast, and, if desired, a seat may be attached to the top of the mast as previously referred to.

It will be obvious that numerous details entering into the construction of the mast and associated parts may be varied over a considerable range without departing from the spirit of my invention or the scope of the appended claims.

What I claim is:

1. A portable elongated foldable mast structure comprising a transportable chassis, a table turnably carried on the chassis, a sectional mast comprising sections foldably mounted in stacked relationship one above the other on the turnable, the sections being rigid and extending longitudinally of the chassis beyond the turntable, the lower section having an extension positioned on the turntable when the mast is in folded position, and having a free end with a pulley roller thereat for initially engaging the turntable as a roller when the raising action is started, and later acting as a pulley to receive a raising cable, and means on the chassis for raising the mast to reception position.

2. A portable foldable antenna mast structure comprising a transportable elongated chassis, a table turnably carried on the chassis, means for positioning the chassis on the ground so the turntable is substantially level, an antenna mast carried on the turntable and composed of a plurality of elongated rigid sections at least partially jointed so the sections may be folded one above the other for transportation, means on the chassis for raising the antenna sections to a vertical position, said means including an extension of the lower section which extension has roller means for running on the turntable during the initial stages of raising the mast, the roller acting as a pulley for a cable during the final step of raising and the initial step of lowering the mast, means for locking the sections securely together during at least the final step of raising thereof, and means applicable to said extension for positioning the raised mast in a perpendicular position and also for tilting it a few degrees on either side of its perpendicular position.

3. A portable foldable antenna mast structure comprising a transportable elongated chassis, a turntable with means for turning it carried on the chassis, an antenna mast composed of rigid elongated sections adapted to be foldably mounted in stacked relation on the turntable and extending longitudinally of the chassis and beyond the turntable, the lower section having a triangularly shaped extension lying across the turntable when the mast is folded, a roller pulley being carried at the apex of the extension to roll on the turntable during the initial stage of raising the mast and to receive a pull-cable during the final stage of raising the mast, and means on the chassis for supplying at least the major part of the means for raising the antenna mast to reception position.

4. A portable foldable antenna mast structure including a transportable elongated chassis, a turntable carried by the chassis, means attachable to the chassis for adjusting the chassis so the turntable at least will be level, an antenna mast composed of rigid elongated sections adapted to be foldably mounted in stacked relation on the turntable and extending longitudinally of the chassis and beyond the turntable, the lower section having a triangularly shaped extension lying across the turntable when the mast is folded, a roller pulley being carried at the apex of the extension to roll on the turntable during the initial stage of raising the mast and to receive a pull-cable during the final stage of raising the mast, means for anchoring the mast in foldable position to the turnable and chassis for transportation purposes, and means on the chassis including a pull-cable passing around the roller pulley for use in raising the mast to final reception position.

5. A portable foldable antenna mast structure including a transportable elongated chassis, a turntable carried by the chassis, means attachable to the chassis for adjusting the chassis so the turntable at least will be level, the turntable having its peripheral edge provided with circle divisions, an index carried by the chassis in cooperative position with said division, a lamp positioned to light up the index and immediate part of the division on the turntable, an antenna mast composed of rigid elongated sections adapted to be foldably mounted in stacked relation on the turntable and extending longitudinally of the chassis and beyond the turntable, the lower section having a triangularly shaped extension lying across the turntable when the mast is folded, a roller pulley being carried at the apex of the extension to roll on the turntable during the initial stage of raising the mast and to receive a pull-cable during the final stage of raising the mast, and means on the chassis including a pull-cable passing around the roller pulley for assisting in raising the mast to final reception position.

6. A portable foldable antenna mast structure including a transportable chassis, a turntable carried by the chassis, means attachable to the chassis for adjusting the chassis so the turntable at least will be level, a sectional antenna mast foldably mounted on the turntable, vertically extending support arms positioned in spaced relation on opposite sides of the axis of the turntable, the turntable having leg attachment means spaced near its outer periphery, members pivotally supported intermediate their ends to the upper ends of said arms, a pair of legs securely anchored to one end of each of said pivoted members and extending at an angle to each other and to said member, the legs being long enough to reach said attachment means, means for fastening the legs to said attachment means, a rigid base portion for the lower section of the mast extending between said arms when the mast is in folded position and having spaced projecting parts to which said members, pivoted to said arms, are also pivoted at the ends, having the legs fastened thereto, an upper section of the mast hinged at one side to the lower section of the mast when the mast is in folded position, and means for anchoring the opposite sides of the mast sections together when in raised position.

7. A portable foldable antenna mast structure including a transportable chassis, a turntable carried by the chassis, vertically extending arms fastened to the turntable on opposite sides of its axis, braces for said arms, each brace comprising a member pivoted intermediate its ends to the upper end of an arm and a pair of spread legs anchored to said member and extending toward the turntable, with means for fastening the legs to the turntable during a step in the raising of the mast, the mast having a lower section to which said braces are pivoted and a sub-base portion extending between said arms and supported by the turntable when the mast is in folded position, the mast having an upper section hinged at one end and side to one side and at the end of the lower section, and adapted to be folded over the lower section and between said arms for transportation purposes, and means for supporting the outer end of the lower section and the top end of the upper section on the chassis.

8. A portable foldable antenna mast structure including a transportable chassis, a turntable carried by the chassis, vertically extending arms fastened to the turntable on opposite sides of its axis, braces for said arms, each brace comprising a member pivoted intermediate its ends to the upper end of an arm and a pair of spread legs anchored to said member and extending toward the turntable, with means for fastening the legs to the turntable during a step in the raising of the mast, the mast having a lower section to which said braces are pivoted and a sub-base portion somewhat pyramidal in shape and extending between said arms and resting on the turntable when the mast is in folded position, the apex of the sub-base having a pulley-roller in engagement with the turntable for assisting in moving the sub-base backwardly for the initial step in raising the mast and later acting as a cable guide and pulley for subsequent steps in raising the mast, the mast having an upper section partially hinged to the lower section when in folded position and extending forwardly over and resting on the bottom section.

9. A portable foldable antenna mast structure including a chassis, a turntable revolvably mounted on the chassis, a sectional antenna mast carried by the turntable, the sections being foldable one above the other so the over-all height of the whole structure will allow it to be transported under the ordinary highway bridges, and means carried by the turntable for assisting in raising the sections laterally upwardly to gain distance for swinging the sections in order to raise the mast, said means being foldable away from the turntable when the mast is in folded position, but the said means being in a generally vertical position when the mast is in reception position.

10. A portable foldable antenna mast structure including a transportable chassis, a circular table revolvably carried on the chassis, spaced support arms extending vertically from the table, a bottom mast section having a sub-base projecting between said arms and supported on the table when the said section is in folded position, a roller-pulley at the free end of the sub-base, a top section overlying the bottom section and hinged at the end on one side to the bottom section and extending between said arms, a brace structure movably carried on the upper ends of each of said arms, each brace structure comprising a pair of legs and a centrally located member pivoted to its arm and also rotatably fastened at one end to the end of the lower section preferably at the junction with the sub-base, the legs being long enough to be fastened to means on the table when the mast is in raised position.

11. A portable foldable antenna mast structure including a transportable chassis, a circular table revolvably carried on the chassis, spaced support arms extending vertically from the table, a bottom mast section having a sub-base projecting between said arms and supported on the table when the said section is in folded position, a roller-pulley at the free end of the sub-base, a top section overlying the bottom section and hinged at the end on one side to the bottom section and extending between said arms, a brace structure movably carried on the upper ends of each of said arms, each brace structure comprising a pair of legs and a centrally located member pivoted to its arm and also rotatably fastened at one end to the end of the lower section preferably at the junction with the sub-base, the legs being long enough to be fastened to means on the table when the mast is in raised position, a bearing structure including members extending horizontally from the table, vertically extending members adapted to be mounted at the ends of said horizontally extending members and having inwardly bent ends, brace members fastened at one end to the table and extending at an angle thereto and into engagement with said inwardly bent ends and fastened thereto, a bearing carried by the upper part of said bearing structure, an adjusting screw carried by said bearing, a bushing oscillatably carried by the sub-base at the roller-pulley end, the bushing being transversely threaded to receive said screw, said angularly positioned brace members having holes therethrough preferably located arcuately with respect to the pivotal point at said sub-base and lower section junction, and means passing through said holes and fastened to said bushing for holding the sub-base and mast in any position as adjusted by said screw in its action on said bushing.

12. A transportable antenna supporting structure including, a transportable chassis, a turntable mounted on the chassis, a mast assembly having four foldable parts, a lower section having a projecting sub-base, a top hinged to the lower section and a pair of brace units located one on each side of the lower section and pivoted preferably at the junction of the sub-base and lower section.

13. A transportable antenna supporting structure including, a transportable chassis, a turntable mounted on the chassis, a mast assembly having four foldable parts, a lower section having a projecting sub-base, a top hinged to the lower section and a pair of brace units located one on each side of the lower section and pivoted preferably at the junction of the sub-base and lower section, means on the chassis for moving the brace units from their folded position to their mast-erection position, a part of said means being shiftable to assist in moving the said section to a position where the sections may be locked together and then being further shiftable to raise the mast to full elevated and operative position for the antenna, means for adjustably positioning and fastening the sub-base on the turntable, and means on the chassis for rotating the turntable.

14. Means for raising the antenna mast as defined in claim 12, comprising jacks and outriggers for fixing the chassis so the table is level, a winch carried on the rear end of the chassis, a cable on the winch adapted to be initially attached to the free end of at least one of said members 13 of the brace structure, means for actuating the winch to cause the cable to move the mast sections from the position of Figure 1 to the position of Figure 3 after the mast section has been freed of all transportation fastenings, brace members 24 on the sub-base adapted to be attached to members 20 of the bottom mast section shortly after the initial raising movement is started, the said brace structure being fastened in the position of Figure 3 when reached, means on the top section for attaching the cable thereto after disconnecting it from said brace member and passing it over said roller-pulley as shown in Figures 3 and 3a, means comprising a rope attached to the top section near its free end for manually assisting in causing the section to move around its hinge joints, as shown in Figures 4 and 4a, the winch and cable acting as a snubber to lower the top section after it passes the perpendicular, a ladder-type support to receive the top section after it has been lowered to the position of Figures 5 and 5a, means for raising the hinged ends of the sections from the position of Figures 5 and 5a to that of Figures 6 and 6a, comprising a hook on the chassis to receive the end of said cable now removed from the top section but passing around the roller-pulley, means for securely fastening the two sections together as shown in Figure 6, said winch and cable now acting to raise the entire mast to the position of Figures 8, 8a and 8b, means for fastening the mast in reception position, and further adjustable means for tilting the mast a few degrees as and for the purpose described.

15. A portable foldable mast structure comprising a transportable elongated chassis, a table turnably carried on the chassis, means for positioning the chassis on the ground so the turntable is substantially level, a mast of two rigid sections foldably mounted in stacked relationship, one above the other, on the turntable and extending beyond the turntable longitudinally of the chassis, the lower section having a sub-base extending from one end thereof and positioned across the turntable and having a free end with rotatable means thereat for running on the table during the initial stage of raising the mast structure, and means on the chassis for moving the sub-base into various positions while raising the mast to reception position, at which time the sub-base is located above the turntable.

16. A portable foldable mast structure comprising a transportable elongated chassis, a table turnably carried on the chassis, means for positioning the chassis on the ground so the turntable is substantially level, a mast carried on the turntable and composed of a plurality of elongated rigid sections at least partially jointed so the sections may be folded in stacked relation, one above the other, and longitudinally of the chassis for transportation, the lower section having an extension lying across the turntable when the mast is in stacked position, and a roller carried by the extremity of said extension for engaging the turntable and reducing the friction of such engagement when starting to raise the mast, means on the chassis for moving said extension in different directions above the turntable for assisting in raising the sections to a vertical position with the extension elevated above the turntable in its final raised position, and means for locking the sections securely together during at least the final step of raising thereof, and means applicable to said extension in its final raised location for anchoring the mast in vertical position.

KIBBEY WHITMAN COUSE.